(12) United States Patent
Koizumi et al.

(10) Patent No.: US 6,433,604 B2
(45) Date of Patent: Aug. 13, 2002

(54) PHASE ADJUSTMENT TECHNIQUE

(75) Inventors: Shinji Koizumi; Masakazu Asakawa, both of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/745,518

(22) Filed: Dec. 22, 2000

(30) Foreign Application Priority Data

Dec. 24, 1999 (JP) .............................................. 11-368135

(51) Int. Cl.$^7$ ................................................ H03H 11/16
(52) U.S. Cl. ...................................... 327/243; 327/230
(58) Field of Search ................................... 327/230, 231, 327/232, 233, 234, 243

(56) References Cited

U.S. PATENT DOCUMENTS 4,593,413 A * 6/1986 Ozaki .......................... 455/139

FOREIGN PATENT DOCUMENTS

| JP | 1-133452 | 5/1989 |
| JP | 5-55873 | 3/1993 |

* cited by examiner

*Primary Examiner*—Kenneth B. Wells
*Assistant Examiner*—Cassandra Cox
(74) *Attorney, Agent, or Firm*—Dickstein, Shapiro, Morin & Oshinsky, LLP.

(57) ABSTRACT

An adjustment technique allowing easy adjustment of a phase shifter is disclosed. A programmable device (PLD) is connected to the phase shifter so as to correct a standard vector depending on correction data written thereto. When supplying a standard input signal to the phase shifter, the phase and amplitude of the output signal are measured. A standard vector for a sequentially selected one of a plurality of phase points is generated and outputted to the phase shifter. Correction data for a selected phase point is calculated based on the measured phase and amplitude. A VHDL source program is generated from the corrected data for all the phase points to write the correction data into the PLD.

15 Claims, 4 Drawing Sheets

FIG. 4

```vhdl
USE ieee.std_logic_1164.all;

entity ROM2 is port ( AIN   : in  std_logic_vector (7 down to 0);
           DOUT1 : out std_logic_vector (7 down to 0);
           DOUT2 : out std_logic_vector (7 down to 0);
         );

end;

architecture RTL of ROM2 is
begin
        with AIN (7 down to 0) select
             DOUT2 <= "10010001" when "00000000"
                      "10010000" when "00000001"
                      "10010000" when "00000010"
                      "10010000" when "00000011"
                      "10010000" when "00000100"
                      "10010000" when "00000101"
                      "10010000" when "00000111"
                      "10010000" when "00001000"
                      "10010000" when "00001001"
                      "10010000" when "00001010"
                      "10010000" when "00001011"
                      "10001111" when "00001100"
                      "10001111" when "00001101"
                      "10001111" when "00001110"
                      "10001111" when "00001111"

"10001111" when "00010000"
                      "10001110" when "00010001"
                      "10001110" when "00010010"
                      "10001110" when "00010011"
                      "10001110" when "00010100"
                      "10001110" when "00010101"
                      "10001101" when "00010110"
                      "10001101" when "00010111"
                      "10001101" when "00011000"
                      "10001101" when "00011001"
                      "10001100" when "00011010"
                      "10001100" when "00011011"
                      "10001100" when "00011100"
                      "10001011" when "00011101"
                      "10001011" when "00011110"
                      "10001011" when "00011111"
```

PHASE ADJUSTMENT TECHNIQUE

BACKGROUND OF THE INVENTION

1. Field of the Invention

The present invention generally relates to phase adjustment techniques, and in particular to a phase adjustment system and method for a phase shifter.

2. Description of the Related Art

There has been proposed an endless phase shifter (hereinafter abbreviated as EPS) having a read-only memory (ROM) used as a non-linear converter in Japanese Patent Application Unexamined Publication No. H05-55873. More specifically, the ROM stores sine wave data, which is read out depending on a given address signal. The EPS is provided with an accumulator storing phase data, which is used as an address signal to read sine wave data from the ROM. Accordingly, by converting the read sine wave data from digital to analog, the analog sine wave signal whose phase is controlled depending on the phase data can be obtained. It is supplied as a local oscillation signal to a mixer to produce an output signal having a phase thereof also controlled depending on the phase data.

As another prior art, a correction data generator for a multi-level and multi-phase modulator has been proposed by the Inventor (see Japanese Patent Application Unexamined Publication No. H01-133452). According to the correction data generator, when the modulator is provided with reference data for each of the multi-level points, the phase and amplitude of an output of the modulator are measured and compared with the reference data to produce correction data. The correction data is updated until the measured phase and amplitude data are within the specifications. The final correction data for each multi-level point is written into a ROM by a ROM writer. The ROM storing the above correction data is mounted in the modulator and thereafter verification is performed to check whether the modulator produces a precise modulation vector.

However, such a ROM needs a considerably large connection space or a hole, causing a problem about space saving. Especially, a high-frequency circuit such as an EPS is susceptible to such a space or hole, which may cause deteriorated characteristics of modulation, resulting in more difficult circuit design.

Recently, the trend has been for the capacity of a ROM to increase more and more and a relatively small-capacity ROM to be dropped from production. However, the above-described correction data can be stored in only a small-capacity ROM without the need of a large-capacity ROM. Therefore, if a large-capacity ROM must be used, undesired cost is increased.

Further, in the case of a correction data storing ROM, it is not easy to adjust and write correction data onto the ROM.

SUMMARY OF THE INVENTION

An object of the present invention is to provide an adjustment system and method which can achieve a down-sized endless phase shifter without decreasing in phase shift characteristics.

Another object of the present invention is to provide a system and method allowing easy adjustment of a phase shifter.

According to an aspect of the present invention, an endless phase shifter includes: a phase shifter for shifting a phase of an output signal depending on a phase control signal; and a programmable logic device (PLD) connected to the phase shifter, for correcting a standard vector depending on correction data to output a corrected vector as the phase control signal to the phase shifter, wherein the correction phase is written into the PLD through a download connector connected to a computer.

According to another aspect of the present invention, a system for adjusting a phase shifter includes: a programmable logic device (PLD) connected to the phase shifter, for correcting a standard vector depending on correction data written thereto; an analyzer for supplying a standard input signal to the phase shifter and analyzing an output signal of the phase shifter to measure phase and amplitude of the output signal; and a processor for generating a standard vector for a sequentially selected one of a plurality of phase points to output it to the phase shifter, calculating correction data for a selected phase point based on the measured phase and amplitude obtained by the analyzer, and generating a writer for writing correction data for all the phase points into the programmable logic device.

The processor may write predetermined data in the PLD to set the PLD for a through state where the standard vector passes through the PLD to the phase shifter. The standard vector may be transferred from the processor to the PLD through a download connector. The writer may be a data writing program which is automatically generated depending on the correction data for all the phase points. The data writing program may be described in a hardware description language (HDL).

The processor may calculate correction data for each of a plurality of previously selected phase points and then calculates correction data for all the phase points by estimating correction data for phase points positioned between adjacent ones of the selected phase points using interpolation.

According to further another aspect of the present invention, a method for adjusting a phase shifter includes the steps of: a) providing the phase shifter with a standard vector for a sequentially selected one of a plurality of phase points; b) analyzing an output signal of the phase shifter to measure phase and amplitude of the output signal with respect to an input standard signal; c) calculating correction data for a selected phase point based on the measured phase and amplitude; d) storing correction data for all the phase points; and e) writing the correction data in a programmable logic device (PLD) so as to provide the phase shifter with a corrected vector for each of the phase points.

The step (c) may include the steps of: c.1) determining whether the measured phase and amplitude fall into a predetermined range; c.2) when the measured phase and amplitude fall out of the predetermined range, generating an updated vector by changing the standard vector based on errors between the measured phase and amplitude and the predetermined range; c.3) providing the phase shifter with the updated vector; c.4) repeating the steps (b), (c.1), (c.2), and (c.3) until the measured phase and amplitude fall into the predetermined range; c.5) when the measured phase and amplitude fall into the predetermined range, calculating correction data based on the updated vector and the standard vector.

The step (c) may further include the step of: c.6) calculating correction data for phase points positioned between adjacent ones of the selected phase points using interpolation.

The step (e) may include the steps of: e.1) automatically generating a data writing program depending on the correction data for all the phase points; and e.2) writing the correction data in the programmable logic device (PLD) by executing the data writing program.

BRIEF DESCRIPTION OF THE DRAWINGS

FIG. 4 is a diagram showing a part of a VHDL source program that has been automatically edited.

DETAILED DESCRIPTION OF THE PREFERRED EMBODIMENT

Figure 1:
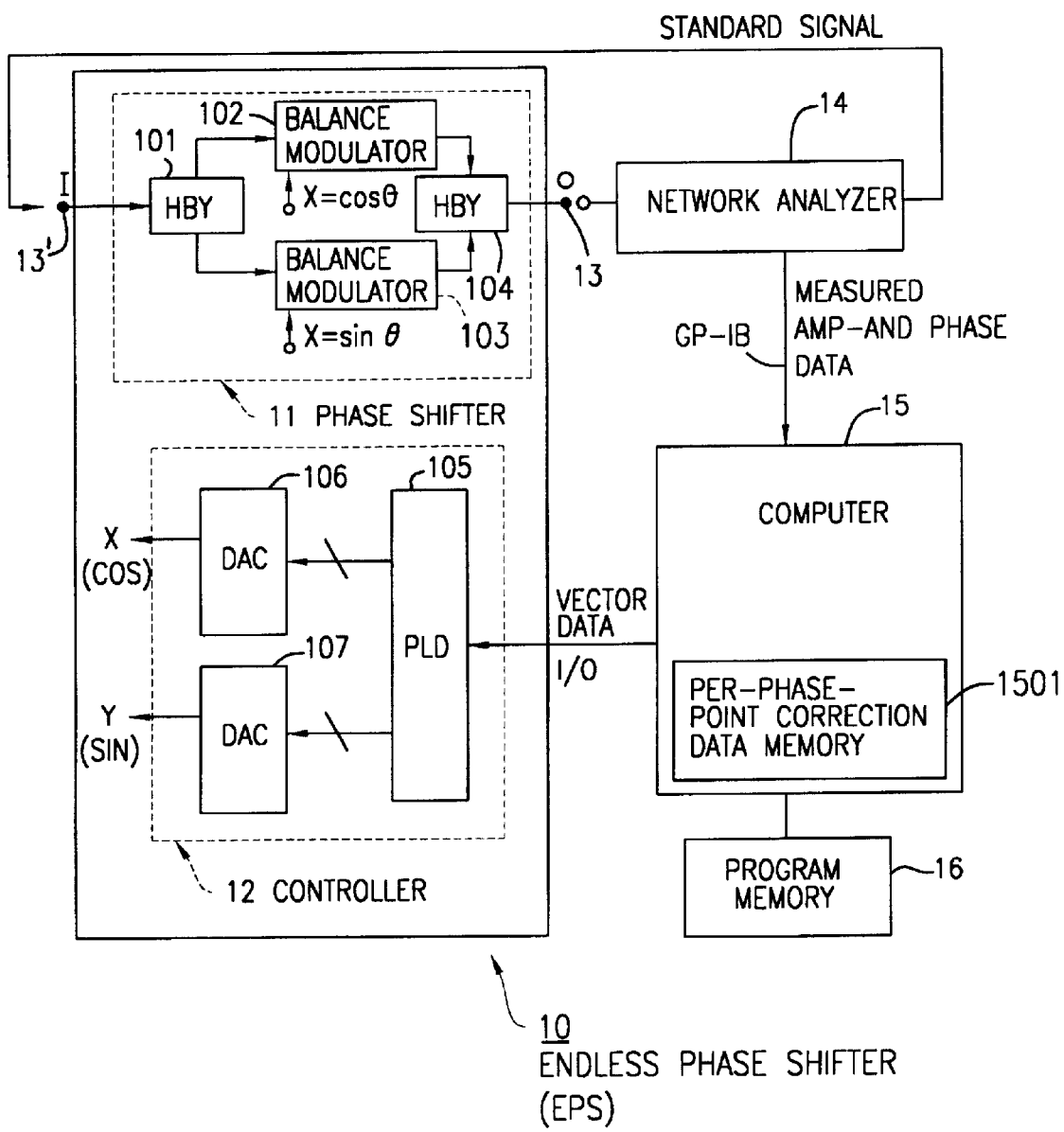
FIG. 1 is a block diagram showing an adjustment system for an endless phase shifter (EPS) according to an embodiment of the present invention.

Referring to FIG. 1, an endless phase shifter (EPS) 10 includes a phase shifter 11 and a controller 12. An output terminal and input terminal of the phase shifter 11 are connected to an output terminal 13 and input terminal 13' of the EPS, respectively. The controller 12 supplies SIN (sine) and COS (cosine) data X and Y to the phase shifter 11, which shifts the phase of an input signal depending on the sine and cosine data X and Y.

The phase shifter 11 includes a hybrid 101, a pair of balance modulators 102 and 103, and a hybrid 104. The input signal received at the input terminal 13' balanced by the hybrid 101 to be outputted to the balance modulators 102 and 103. The balance modulator 102 shifts the phase of an output signal using the cosine wave signal X received from the controller 12. The balance modulator 103 shifts the phase of an output signal using the sine wave signal Y received from the controller 12. The respective output signals of the balance modulators 102 and 103 are combined by the hybrid 104 to produce a phase-shifted output signal, which is outputted from the output terminal 13.

The controller 12 includes a programmable logic device (hereinafter abbreviated as PLD) 105, digital-to-analog (DA) converters 106 and 107. In an adjustment mode after through data has been written into the PLD 105 as described later, the PLD 105 receives vector data of SIN and COS data for each of selected phase points from the computer 15 and outputs the SIN data and the COS data to respective ones of the DA converters 106 and 107. The analog cosine wave signal X is output from the DA converter 106 to the balance modulator 102 and the analog sine wave signal Y is output from the DA converter 107 to the balance modulator 103.

In an operation mode after correction data has been written into the PLD 105, the PLD 105 produces corrected SIN and COS data from input vector data so that the EPS 10 outputs a desired precise signal.

In an adjustment system including a network analyzer 14 and a computer 15, the output terminal 13 of the EPS 10 is connected to an input terminal of the network analyzer 14. An output terminal of the network analyzer 14 is connected to the input terminal 13' of the EPS 10. The network 14 outputs a standard signal to the phase shifter 11 and then inputs a phase-shifted output signal from the phase shifter 11. The network analyzer 14 analyzes the phase-shifted output signal to measure the amplitude and phase thereof.

The computer 15 controls the operations of the adjustment system. The computer 15 receives the measured amplitude and phase data from the network analyzer 14 and produces the vector data (SIN and COS data) and correction data for each of the selected phase points of a standard sine wave according to an adjustment control program running on the computer 15. As described later, the computer 15 has a memory 1501 for storing correction data for each of all the predetermined phase points of the standard sine wave. A program memory 16 stores control programs including the adjustment control program, a PLD data write program, and other necessary programs.

Figure 2:
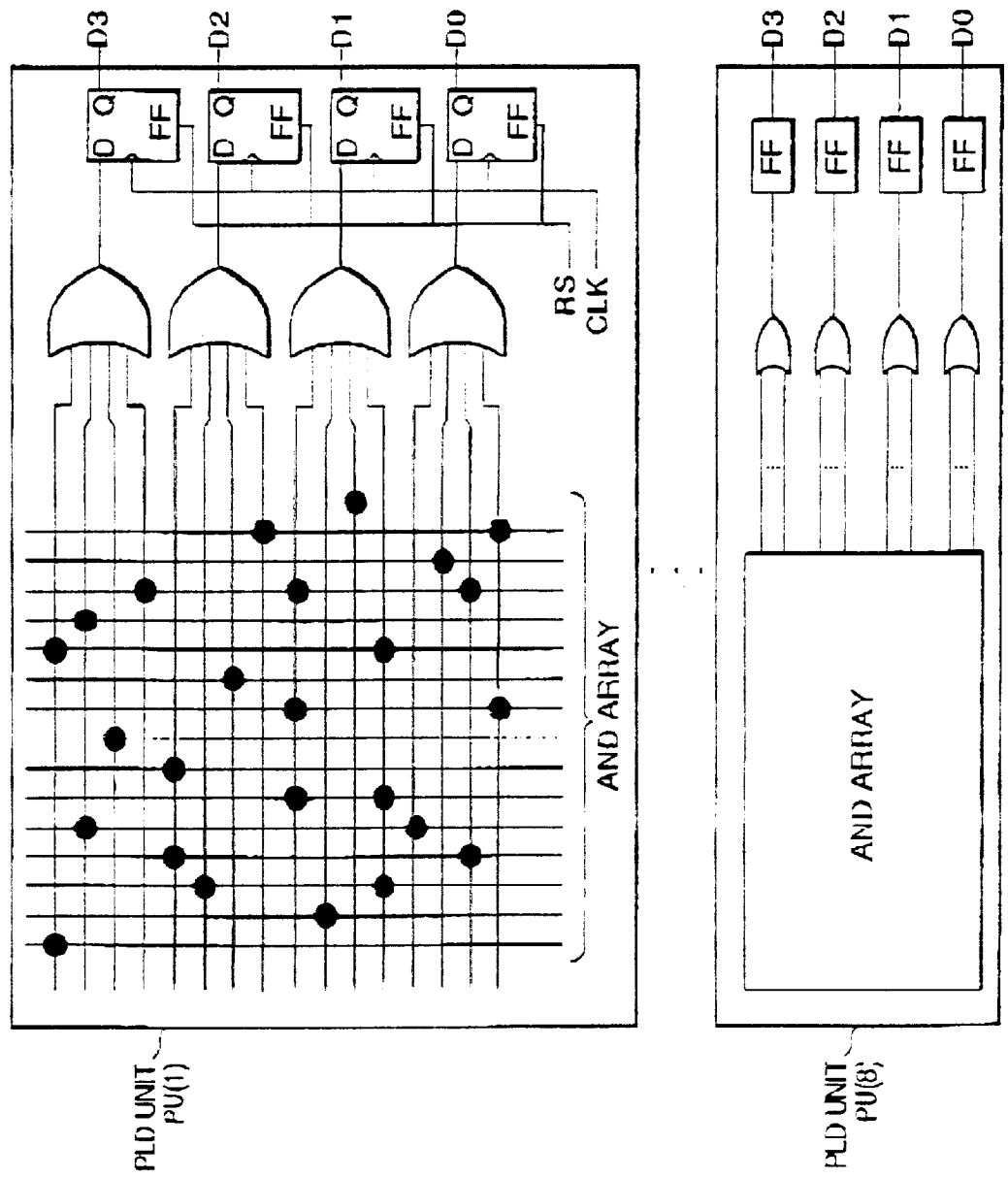
FIG. 2 is a block diagram showing an example of a programmable logic device (PLD) used in the embodiment.

Referring to FIG. 2, the PLD 105 includes eight PLD units PU(1)-PU(8) and a serial-to-parallel converter (not shown), which converts serial data received from the computer 15 to parallel data. Each of the PLD units PU(1)-PU(8) includes a 16×16 AND array, a four-OR array, and four flip-flop circuits (FFs). In this embodiment, the PLD units PU(1)-PU(8) provide a sufficient capacity to store correction data for all the predetermined phase points of the standard sine wave. In the case of a 64k-ROM used for non-linear conversion, a large capacity may be useless.

EPS ADJUSTMENT OPERATION

It is assumed that phase points for measurement are previously selected from the predetermined phase points of the standard sine wave so as to increase the speed of adjustment operation and that the network analyzer 14 outputs the standard signal to the phase shifter 11 and inputs the phase-shifted output signal corresponding to the given standard signal from the phase shifter 11.

Figure 3:
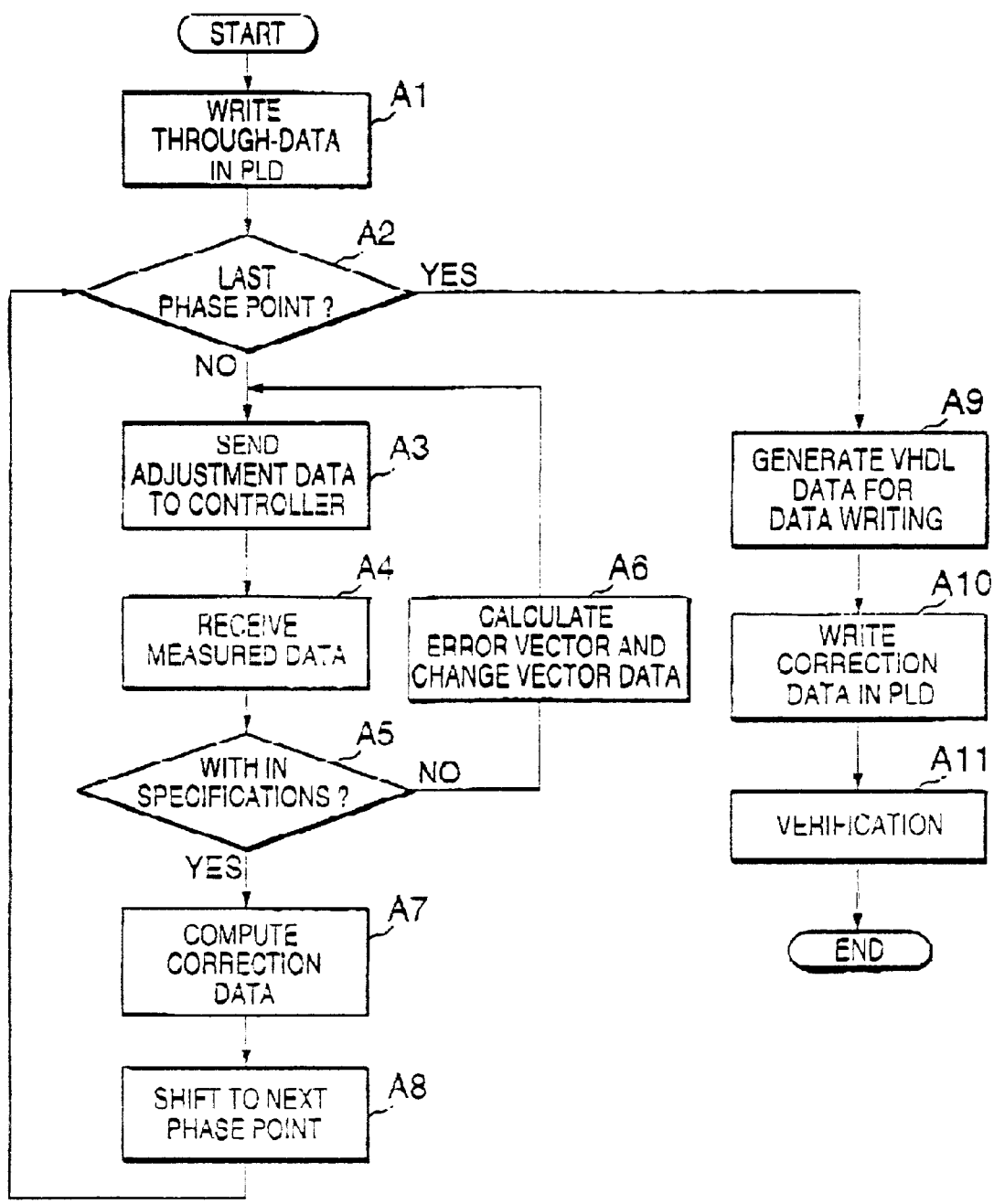
FIG. 3 is a flowchart showing an EPS adjustment method according to the embodiment.

Referring to FIG. 3, when starting the EPS adjustment program running on a microprocessor of the computer 15, the computer 15 writes the through data in the PLD 105 via a download connector so that the PLD 105 transfers data received from the computer 15 as it is to the DA converters 106 and 107 (step A1).

Thereafter, the computer 15 determines whether a phase point in question is the last of the selected phase points (step A2). When it is not the last phase point (NO at step A2). The computer 15 sends the standard vector data of SIN and COS data for the said phase point to the PLD 105 (step A3).

When receiving the SIN and COS data for the selected phase point from the computer 15, the PLD 105 outputs the SIN data and the COS data as they are to respective ones of the DA converters 106 and 107. Accordingly, an analog standard cosine wave signal X is output from the DA converter 106 to the balance modulator 102 and an analog standard sine wave signal Y is output from the DA converter 107 to the balance modulator 103. The phase shifter 11 shifts the phase of its output signal depending on the standard cosine and sine wave signals X and Y to output the phase-shifted signal to the network analyzer 14.

The network analyzer 14 analyzes the phase-shifted output signal to measure the amplitude and phase thereof and outputs the measured amplitude and phase data for the said phase point to the computer 15.

When receiving the measured amplitude and phase data for the said phase point from the network analyzer 14 (step A4), it is determined whether the measured amplitude and phase data fall within predetermined specifications (step A5). If out of the predetermined specifications (NO at step A5), then the computer 15 calculates an error vector based on the measured data and the specifications (step A6) and the control goes back to the step A3 so that vector data updated by the calculated error vector is sent to the PLD 105. In this manner, the steps A3 through A6 are repeatedly performed while changing vector data until the measured amplitude and phase data fall within the predetermined specifications.

When the measured amplitude and phase data fall within the predetermined specifications (YES at step A5), the computer 15 computes correction data for the said phase point from the finally updated vector data and the standard vector data and stores the correction data for the said phase point into the correction data memory 1501 (step A7). At this stage, the computer 15 can estimate correction data for phase points positioned between the previous phase point and the said phase point by using linear approximation or Taylor's series expansion and stores the correction data for these phase points in the correction data memory 1501. Then, the phase point is shifted to the next phase point (step A8) and the control goes back to the step A2.

The steps A2 through A8 are repeatedly performed until the correction data for all the selected phase points have been calculated. When measurement and calculation for all the phase points have been completed (YES at step A2), the computer 15 starts the data write program to generate a VHDL source program that described a logic circuit implementing the correction data for all the phase points to be written onto the PLD 105 (step A9). The VHDL source program is described using HDL (hardware description language) such as VHDL as shown in FIG. 4, which is easy to be edited.

Then, the computer 15 complies the VHDL source program to produce a gate-level data file, which is used to write the correction data onto the PLD 105 through the download connector (step A10). Thereafter, verification is made (step A11).

Therefore, compared with the case using a ROM, the PLD causes the time required for adjusting and storing correction data to be considerably reduced. Further, since VHDL program can be automatically generated and used before actual implementation, the adjustment process becomes simplified and the reliability and quality of the system are substantially improved.

Furthermore, since the download connector is used to perform the phase adjustment for the EPS 10, only a small hole for the download connector is needed, which results in that a downsized EPS can be achieved without reducing in reliability and quality of the whole system. In contrast, according to the prior art using the ROM, a relatively large hole for installing the ROM is needed, resulting in effective influence on the high-frequency characteristics.

As described above, the PLD is used for non-linear conversion to store correction data for the phase shifter in place of the ROM. Therefore, the procedure of adjustment can be simplified and the time required for the adjustment is reduced. This may cause the cost of an EPS to be reduced. In addition, since only a small hole for the download connector is needed, the high-frequency characteristics of the EPS become stable and reliable.

What is claimed is:

1. A system for adjusting a phase shifter, comprising:
   a programmable logic device connected to the phase shifter, for correcting a standard vector depending on correction data written thereto;
   an analyzer for supplying a standard input signal to the phase shifter and analyzing an output signal of the phase shifter to measure phase and amplitude of the output signal; and
   a processor for generating the standard vector for a selected one of a plurality of phase points of the output signal to output it to the phase shifter, calculating correction data for the selected phase point based on the measured phase and amplitude obtained by the analyzer, and generating a source program for writing correction data for all the phase points into the programmable logic device.

2. The system according to claim 1, wherein the processor writes predetermined data in the programmable logic device to set the programmable logic device for a through state where the standard vector passes through the programmable logic device to the phase shifter.

3. The system according to claim 2, wherein the standard vector is transferred from the processor to the programmable logic device through a download connector.

4. The system according to claim 1, wherein the source program is a data writing program which is automatically generated depending on the correction data for all the phase points.

5. The system according to claim 4, wherein the data writing program is described in a hardware description language.

6. The system according to claim 1, wherein the processor calculates correction data for each of a plurality of previously selected phase and then calculates correction data for all other phase points by estimating correction data for phase points positioned between adjacent ones of the selected phase points using interpolation.

7. A system for adjusting an endless phase shifter, the system comprising:
   a phase shifter which shifts a phase of an output signal based upon an input signal;
   a programmable logic device coupled to the phase shifter, the programmable logic device being effective to receive correction data and to output a corrected vector to the phase shifter in response to the corrected data, the corrected data being sent to the programmable logic device through a download connector;
   an analyzer coupled to the phase shifter, the analyzer effective to supply a standard input signal to the phase shifter and to receive and analyze an output signal of the phase shifter by measuring the phase and amplitude of the output signal; and
   a computer coupled to the analyzer and to the programmable logic device, the computer being effective to generate a standard vector and output the standard vector to the phase shifter through the programmable logic device, the computer further effective to calculate the correction data for a selected phase point based on the measured phase and amplitude measured by the analyzer, the computer further effective to generate a source program to input correction data for all phase points into the programmable logic device through the download connector.

8. A method for adjusting a phase shifter, comprising the steps of:
   a) providing the phase shifter with a standard vector;
   b) analyzing an output signal of the phase signal to measure phase and amplitude of the output signal with respect to an input standard signal;
   c) calculating correction data for a selected phase point of the output signal based on the measured phase and amplitude;
   d) storing correction data for all the phase points; and
   e) writing the correction data in a programmable logic device so as to provide the phase shifter with a corrected vector for each of the phase points.

9. The method according to claim 8, wherein the step (c) comprises the steps of:
   c.1) determining whether the measured phase and amplitude fall into a predetermined range;
   c.2) when the measured phase and amplitude fall out of the predetermined range, generating an updated vector by changing the standard vector based on errors between the measured phase and amplitude and the predetermined range;

c.3) providing the phase shifter with the updated vector;

c.4) repeating the steps (b), (c.1), (c.2), and (c.3) until the measured phase and amplitude fall into the predetermined range;

c.5) when the measured phase and amplitude fall into the predetermined range, calculating correction data based on the updated vector and the standard vector.

10. The method according to claim 9, wherein the step (c) further comprises the step of:

c.6) calculating correction data for phase points positioned between adjacent ones of the selected phase points using interpolation.

11. The method according to claim 8, wherein the step (e) comprises the steps of:

e.1) generating a data writing program depending on the correction data for all the phase points; and e.2) writing the correction data in the programmable logic device by executing the data writing program.

12. The method according to claim 11, wherein the data writing program is described in a hardware description language.

13. The method according to claim 8, wherein the programmable logic device has been set to a through state where data passes therein the programmable logic device to the phase shifter before the step (a).

14. The method according to claim 13, wherein the step (c) comprises the steps of:

c.1) determining whether the measured phase and amplitude fall into a predetermined range;

c.2) when the measured phase and amplitude fall out of the predetermined range, generating an updated vector by changing the standartd vector based on errors between the measured phase and amplitude and the predetermined range;

c.3) providing the phase shifter with the updated vector;

c.4) repeating the steps (b), (c.1), (c.2), and (c.3) until the measured phase and amplitude fall into the predetermined range;

c.5) when the measured phase and amplitude fall into the predetermined range, calculating correction data based on the updated vector and the standard vector.

15. A system for adjusting a phase shifter, the system comprising:

a programmable logic device connected to the phase shifter, the programmable logic device effective to receive a standard vector and to modify the standard vector based on correction data;

an analyzer coupled to the phase shifter, the analyzer being effective to supply a standard vector to the phase shifter and to analyze an output signal of the phase shifter by measuring the phase and amplitude of the output signal; and a processor coupled to the analyzer and to the programmable logic device, the processor being effective to generate the standard vector for a selected one of a plurality of phase points of the output signal, the processor further being effective to calculate correction data for the selected phase point based on the phase and amplitude of the output signal, and the processor further being effective to generate a source program including correction data for all the phase points.

* * * * *